(12) United States Patent
Liu et al.

(10) Patent No.: US 11,089,650 B2
(45) Date of Patent: Aug. 10, 2021

(54) TASK PROCESSING METHOD IN COMMUNICATIONS NETWORK AND COMMUNICATIONS APPARATUS

(71) Applicant: HUAWEI TECHNOLOGIES CO., LTD., Shenzhen (CN)

(72) Inventors: Ju Liu, Reading (GB); Jiehua Xiao, Shanghai (CN); Xiaojun Luo, Shanghai (CN); Ming Fang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 119 days.

(21) Appl. No.: 16/682,436

(22) Filed: Nov. 13, 2019

(65) Prior Publication Data

US 2020/0084830 A1    Mar. 12, 2020

Related U.S. Application Data

(63) Continuation of application No. PCT/CN2018/089149, filed on May 31, 2018.

(30) Foreign Application Priority Data

May 31, 2017  (CN) .......................... 201710400153.9

(51) Int. Cl.
*H04W 8/22* (2009.01)
*H04W 48/16* (2009.01)
(Continued)

(52) U.S. Cl.
CPC ............. *H04W 80/12* (2013.01); *H04W 8/24* (2013.01); *H04W 48/16* (2013.01); *H04W 92/10* (2013.01)

(58) Field of Classification Search
None
See application file for complete search history.

(56) References Cited

U.S. PATENT DOCUMENTS

2009/0219990 A1   9/2009   Han et al.
2014/0007175 A1   1/2014   Cho et al.
(Continued)

FOREIGN PATENT DOCUMENTS

CN         102622265 A         8/2012
CN         103685373 A         3/2014
(Continued)

OTHER PUBLICATIONS

The extended European search report dated Jan. 16, 2020 from corresponding application No. EP 18809444.5.
(Continued)

*Primary Examiner* — Duc T Duong
(74) *Attorney, Agent, or Firm* — Hauptman Ham, LLP

(57) ABSTRACT

A method includes receiving a task processing request from user equipment (UE) and obtaining application layer information for the task processing request and capability information of the UE for the task processing request. The method also includes obtaining access stratum information. The method further includes sending, based on the capability information, the application layer information, and the access stratum information, processing indication information to an apparatus for executing the task. The processing indication information instructs the apparatus to process the task corresponding to the task processing request. The apparatus for executing the task is at least one of the UE, an access network device, a core network device, or an Internet server.

19 Claims, 7 Drawing Sheets

(51) Int. Cl.
*H04W 80/12* (2009.01)
*H04W 8/24* (2009.01)
*H04W 92/10* (2009.01)

(56) References Cited

U.S. PATENT DOCUMENTS

| | | |
|---|---|---|
| 2014/0038654 A1 | 2/2014 | Sassan Ahmadi |
| 2014/0136709 A1* | 5/2014 | Chin ................ H04W 4/12 709/226 |
| 2016/0007138 A1* | 1/2016 | Palanisamy ............ H04W 4/50 455/41.2 |
| 2016/0048414 A1 | 2/2016 | Quigley et al. |
| 2016/0112502 A1 | 4/2016 | Clarke et al. |
| 2016/0148414 A1 | 5/2016 | Itani et al. |
| 2016/0205495 A1 | 7/2016 | Hu et al. |
| 2016/0205504 A1 | 7/2016 | Chen et al. |
| 2016/0292011 A1 | 10/2016 | Colson et al. |
| 2016/0374050 A1* | 12/2016 | Prasad ............... H04L 12/1868 |
| 2018/0183855 A1* | 6/2018 | Sabella ............... H04L 47/803 |
| 2018/0220397 A1* | 8/2018 | Paredes Cabrera ... H04W 48/12 |
| 2019/0159033 A1* | 5/2019 | Liu .................... H04M 15/65 |
| 2019/0182386 A1* | 6/2019 | Sharma .............. H04L 12/141 |
| 2019/0342821 A1* | 11/2019 | Kim .................... H04W 76/18 |
| 2020/0100080 A1* | 3/2020 | Mladin ................ H04W 4/70 |
| 2021/0136548 A1* | 5/2021 | Mladin ................ H04W 4/50 |

FOREIGN PATENT DOCUMENTS

| | | |
|---|---|---|
| CN | 104717632 A | 6/2015 |
| CN | 104731647 A | 6/2015 |
| CN | 105338358 A | 2/2016 |
| CN | 106020966 A | 10/2016 |
| WO | 2015043050 A1 | 4/2015 |
| WO | 2017014428 A1 | 1/2017 |
| WO | 2017066936 A1 | 4/2017 |

OTHER PUBLICATIONS

Office Action dated Mar. 16, 2020 from corresponding application No. CN 201710400153.9.

International search report dated Aug. 21, 2018 from corresponding application No. PCT/CN2018/089149.

* cited by examiner

| Recommended tuning interval | Tuning interval (unit: ms) |
|---|---|
| 0000 | 1 |
| 0001 | 2 |
| 0010 | 3 |
| 0011 | 4 |
| ... | ... |
| 1000 | 0.1 |
| 1001 | 0.2 |
| ... | ... |
| 1111 | 0.8 |

FIG. 8

| Recommended tuning interval | Tuning interval |
|---|---|
| 0000 | Increased by one level |
| 0001 | Increased by two levels |
| 0010 | Increased by three levels |
| 0011 | Increased by four levels |
| ... | |
| 1000 | Decreased by one level |
| 1001 | Decreased by two levels |
| ... | Decreased by three levels |
| 1111 | Decreased by four levels |

FIG. 9

TASK PROCESSING METHOD IN COMMUNICATIONS NETWORK AND COMMUNICATIONS APPARATUS

CROSS-REFERENCE TO RELATED APPLICATIONS

This application is a continuation of International Application No. PCT/CN2018/089149, filed on May 31, 2018, which claims priority to Chinese Patent Application No. 201710400153.9, filed on May 31, 2017. The disclosures of the aforementioned applications are hereby incorporated by reference in their entireties.

TECHNICAL FIELD

This application relates to the communications field, and in particular, to a task processing method in a communications network and a communications apparatus.

BACKGROUND

In a communications network, when user equipment (User Equipment, UE) wants to complete a task requested by a user, after an evolved NodeB (evolved Node B, eNB) allocates a radio resource to the UE, the UE (for example, an application program installed in the UE) may send a task processing request to a service processing node (for example, a server in the Internet) by using the eNB. After receiving the task processing request, the service processing node processes the task corresponding to the task processing request. The service processing node returns a processing result of the task to the UE after processing the task.

In the foregoing process, only access stratum information (for example, quality of a channel between the UE and the eNB) is considered when the UE interacts with the eNB. For example, to execute an application task, the UE needs to transmit 100-bit data to the server. If the quality of the channel between the UE and the eNB is poor, only service data of about 30 bits can be transmitted each time. In this case, the UE transmits only 30-bit data each time, and transmits the remaining data to the server in a plurality of times by using the eNB.

However, in some cases, for example, when there are limited radio resources and/or the server runs in an overloaded state, if the foregoing processing method is used, there may be a delay in feeding back a result to the UE by the server. Consequently, the server is overloaded, and a spare processing capability of the UE is not fully used. This fails to reduce consumption of radio transmission resources, and is unfavorable to improving resource utilization.

SUMMARY

Embodiments of this application provide a task processing method in a communications network and a communications apparatus, to improve resource utilization.

According to an aspect of this application, a task processing method in a communications network is provided. The method may be performed by various apparatuses in the communications network, for example, performed by an access network device (for example, an eNB or another specifically disposed access network element) and various core network devices. The core network device may be a mobility management entity (Mobility Management Entity, MME), a packet data network gateway (PDN Gateway, PGW), a serving gateway (Serving Gateway, SGW), or the like. In this application, a mobile edge computing (Mobile Edge Computing, MEC) unit may be deployed in the core network device or the access network device.

The task processing method in the communications network includes: receiving a task processing request from UE; obtaining application layer information for the task processing request and capability information of the UE for the task processing request; obtaining access stratum information; and sending, based on the capability information, the application layer information, and the access stratum information, processing indication information to an apparatus for executing the task, where the processing indication information is used to instruct to process the task corresponding to the task processing request, and the apparatus for executing the task is at least one of the UE, the access network device, the core network device, and an Internet server.

The capability information of the UE may include at least one of the following: compute capability information, application processing capability information, and storage capability information. The access stratum information may include at least one of the following: channel quality information, channel strength information, cell load information, network status information, and frequency resource information. The application layer information is information related to task processing, and may include at least one of the following: image recognition capability information, speech recognition capability information, audio/video processing capability information, positioning capability information, and graphics generation capability information.

In the task processing method, task scheduling is performed by comprehensively considering the capability information, the application layer information, and the access stratum information, and the processing indication information is sent to instruct the apparatus for executing the task to process the task. In this way, resource utilization can be improved.

Optionally, before the processing indication information is sent, based on the capability information, the application layer information, and the access stratum information, to the apparatus for executing the task, it may be first determined, based on the capability information, the application layer information, and the access stratum information, that at least one of the UE, the access network device, the core network device, and the Internet server is the apparatus for executing the task.

The task may include at least two child tasks. In a process of determining apparatuses for executing the child tasks, for each child task, an apparatus for executing the child task may be determined based on the capability information, the application layer information, and the access stratum information. The apparatus for executing the child task may be the UE, the access network device, the core network device, or the Internet server. Correspondingly, the processing indication information may be sent to all the apparatuses for executing the child tasks. For example, when the task includes two child tasks, one child task is executed by the UE, and the other child task is executed by the core network device, first processing indication information may be sent to the UE, and second processing indication information may be sent to the core network device.

When the task includes at least two child tasks, for each child task, the apparatus for executing the child task may be determined in any one of the following various different manners.

A manner of determining the apparatus for executing the child task is as follows:

When the access stratum information indicates that the UE is suitable for executing the child task, whether the UE is capable of processing the child task is determined based on the capability information; and when the UE is capable of processing the child task, it is determined that the UE is the apparatus for executing the child task; or when the UE is incapable of processing the child task, it is determined, based on the application layer information, that the access network device, the core network device, or the Internet server is the apparatus for executing the child task.

Alternatively, when the access stratum information indicates that the UE is not suitable for executing the child task, it is determined, based on the application layer information, that the access network device, the core network device, or the Internet server is the apparatus for executing the child task.

Another manner of determining the apparatus for executing the child task is as follows:

When the application layer information indicates that the access network device, the core network device, or the Internet server is capable of processing the child task and is not overloaded, it is determined that the access network device, the core network device, or the Internet server is the apparatus for executing the child task.

Alternatively, when the application layer information indicates that the access network device, the core network device, or the Internet server is capable of processing the child task and is overloaded, whether the UE is capable of processing the child task is determined based on the capability information; and when the UE is incapable of processing the child task, it is determined that the access network device, the core network device, or the Internet server is the apparatus for executing the child task; or when the UE is capable of processing the child task and the UE is suitable for executing the child task, it is determined that the UE is the apparatus for executing the child task; or when the UE is capable of processing the child task and the UE is not suitable for executing the child task, it is determined that the UE, the access network device, the core network device, or the Internet server is the apparatus for executing the child task.

Another manner of determining the apparatus for executing the child task is as follows:

When the capability information indicates that the UE is incapable of processing the child task, it is determined, based on the application layer information, that the access network device, the core network device, or the Internet server is the apparatus for executing the child task.

Alternatively, when the capability information indicates that the UE is capable of processing the child task, whether the access stratum information indicates that the UE is suitable for executing the child task is determined; and when the access stratum information indicates that the UE is suitable for executing the child task, it is determined that the UE is the apparatus for executing the child task; or when the access stratum information indicates that the UE is not suitable for executing the child task, it is determined that the UE, the access network device, the core network device, or the Internet server is the apparatus for executing the child task.

The task processing method in the communications network may be performed by different apparatuses, for example, performed by the access network device (for example, the eNB) and the core network device.

When the access network device (for example, the eNB) performs the task processing method in the communications network provided in this embodiment of this application, the obtaining application layer information for the task processing request may include: obtaining the application layer information for the task processing request from the UE, and obtaining the application layer information for the task processing request from the access network device, the core network device, or the Internet server.

When the core network device performs the task processing method in the communications network, the obtaining access stratum information may include: obtaining the access stratum information from an evolved NodeB corresponding to the UE. Correspondingly, when it is determined that the UE is the apparatus for executing the child task, the task processing method in the communications network may further include: sending a resource allocation request to the evolved NodeB, where the resource allocation request is used to instruct the evolved NodeB to allocate an air interface resource to the UE.

According to another aspect of this application, a computer readable storage medium is provided, and includes an instruction, where when the instruction runs on a computer, the computer is enabled to perform the foregoing task processing method in the communications network.

According to another aspect of this application, a communications apparatus is provided, where the communications apparatus includes a processor and a memory having computer readable instructions stored thereon that, when executed by the processor, cause the apparatus to:

receive a task processing request from user equipment UE;

obtain application layer information for the task processing request and capability information of the UE for the task processing request;

obtain access stratum information; and send, based on the capability information, the application layer information, and the access stratum information, and processing indication information to an apparatus for executing the task, where the processing indication information is used to instruct to process the task corresponding to the task processing request, and the apparatus for executing the task is at least one of the UE, an access network device, a core network device, and an Internet server.

Optionally, the apparatus is further caused to determine, based on the capability information, the application layer information, and the access stratum information, that at least one of the UE, the access network device, the core network device, and the Internet server is the apparatus for executing the task.

Optionally, the task includes at least two child tasks, and the apparatus is further caused to determine, for each child task based on the capability information, the application layer information, and the access stratum information, that the UE, the access network device, the core network device, or the Internet server is an apparatus for executing the child task.

Optionally, the apparatus is further caused to:

when the access stratum information indicates that the UE is suitable for executing the child task, determine, based on the capability information, whether the UE is capable of processing the child task; and when the UE is capable of processing the child task, determine that the UE is the apparatus for executing the child task; or when the UE is incapable of processing the child task, determine, based on the application layer information, that the access network device, the core network device, or the Internet server is the apparatus for executing the child task; or when the access stratum information indicates that the UE is not suitable for executing the child task, determine, based on the application layer information, that the access network device, the core network device, or the Internet server is the apparatus for executing the child task.

Optionally, the apparatus is further caused to:

when the application layer information indicates that the access network device, the core network device, or the Internet server is capable of processing the child task and is not overloaded, determine that the access network device, the core network device, or the Internet server is the apparatus for executing the child task; or when the application layer information indicates that the access network device, the core network device, or the Internet server is capable of processing the child task and is overloaded, determine, based on the capability information, whether the UE is capable of processing the child task; and when the UE is incapable of processing the child task, determine that the access network device, the core network device, or the Internet server is the apparatus for executing the child task; or when the UE is capable of processing the child task and the UE is suitable for executing the child task, determine that the UE is the apparatus for executing the child task; or when the UE is capable of processing the child task and the UE is not suitable for executing the child task, determine that the UE, the access network device, the core network device, or the Internet server is the apparatus for executing the child task.

Optionally, the apparatus is further caused to:

when the capability information indicates that the UE is incapable of processing the child task, determine, based on the application layer information, that the access network device, the core network device, or the Internet server is the apparatus for executing the child task; or when the capability information indicates that the UE is capable of processing the child task, determine whether the access stratum information indicates that the UE is suitable for executing the child task; and when the access stratum information indicates that the UE is suitable for executing the child task, determine that the UE is the apparatus for executing the child task; or when the access stratum information indicates that the UE is not suitable for executing the child task, determine that the UE, the access network device, the core network device, or the Internet server is the apparatus for executing the child task.

Optionally, the communications apparatus is the access network device, and the apparatus is further caused to obtain the application layer information for the task processing request from the UE, and obtain the application layer information for the task processing request from the access network device, the core network device, or the Internet server.

Optionally, the apparatus is further caused to obtain the access stratum information from an evolved NodeB corresponding to the UE; and when determining that the UE is the apparatus for executing the child task, send a resource allocation request to the evolved NodeB, where the resource allocation request is used to instruct the evolved NodeB to allocate an air interface resource to the UE.

In some embodiments, a mobile edge computing unit is deployed in the core network device or the access network device. The capability information of the UE may include at least one of the following: compute capability information, application processing capability information, and storage capability information. The access stratum information may include at least one of the following: channel quality information, channel strength information, cell load information, network status information, and frequency resource information. The application layer information is information related to task processing, and may include at least one of the following: image recognition capability information, speech recognition capability information, audio/video processing capability information, positioning capability information, and graphics generation capability information.

The communications apparatus in a communications network performs task scheduling by comprehensively considering the capability information, the application layer information, and the access stratum information, and sends the processing indication information to instruct the apparatus for executing the task to process the task. In this way, resource utilization can be improved.

BRIEF DESCRIPTION OF DRAWINGS

FIG. 8 is a schematic diagram of a quantized mapping table, in accordance with one or more embodiments.

FIG. 9 is another schematic diagram of a quantized mapping table, in accordance with one or more embodiments.

DESCRIPTION OF EMBODIMENTS

To make the objectives, technical solutions, and advantages of this application clearer, the following further describes the implementations of this application in detail with reference to the accompanying drawings.

Figure 1:
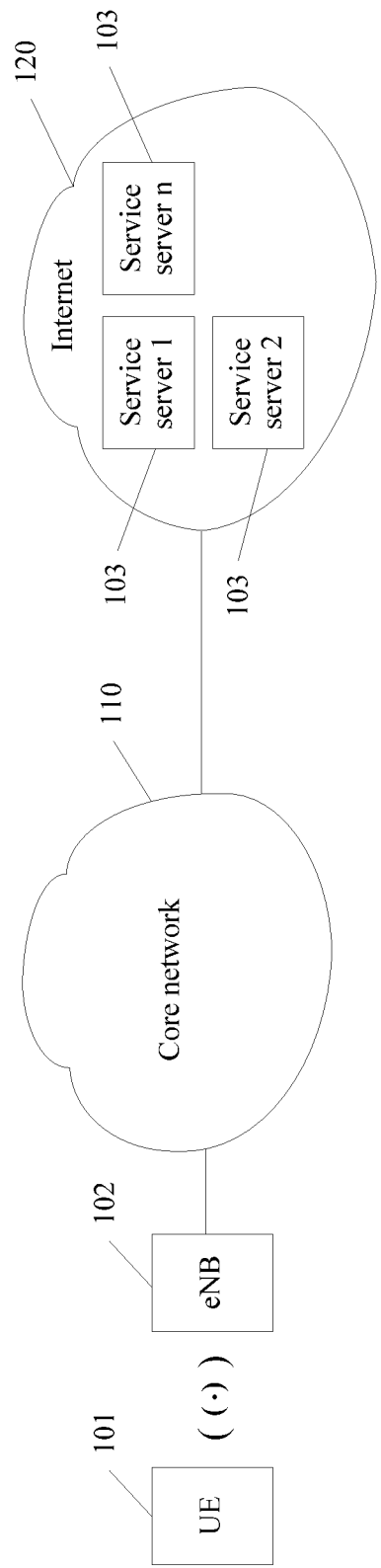
FIG. 1 is a schematic diagram of a communications network, in accordance with one or more embodiments.

FIG. 1 is a schematic diagram of a communications network according to an embodiment of this application. Referring to FIG. 1, the communications network may include UE 101, an eNB 102, a core network 110, and the Internet 120. The UE 101 and the eNB 102 may wirelessly communicate with each other. The Internet 120 may include one or more service servers 103. The one or more service servers 103 may be servers configured to execute various specific services, for example, image recognition servers, text translation servers, or video processing servers. In this embodiment of this application, a MEC unit may be deployed in an access network device (for example, the eNB 102) or a core network device (not shown in FIG. 1). In addition to the eNB, the access network device may include another independent device (for example, a server that is specifically deployed in an access network). The independent device is located in the access network, and a MEC unit may be deployed. The MEC unit assumes some or all of functions of the service server. For example, the MEC unit may assume an image recognition function and a text translation function.

The following provides description by using an example in which a task corresponding to a task processing request includes a plurality of child tasks. In some embodiments, when a MEC unit is deployed in the core network device, after the UE 101 sends a task processing request, the task processing request may be sent to the core network device by using the eNB 102, and the core network device may process at least one child task in a task corresponding to the task processing request, and transfer another child task to the UE 101 and/or the service server 103 in the Internet 120 for execution. Optionally, when a MEC unit is deployed in the access network device (for example, the eNB 102), after receiving a task processing request from the UE 101, the access network device (for example, the eNB 102) may process at least one child task in a task corresponding to the task processing request, and transfer another child task to the UE 101 and/or the service server 103 in the Internet 120 for execution.

In some embodiments, the MEC unit may not be deployed in any apparatus in the communications network. In this case, optionally, after receiving a task processing request from the UE 101, the eNB 102 may transfer at least one child task in a task corresponding to the task processing request to the UE 101 and/or the service server 103 in the Internet 120 for execution. Alternatively, after receiving a task processing request from the UE 101, the eNB 102 may forward the task processing request to the core network device, so that the core network device may transfer at least one child task in a task corresponding to the task processing request to the UE 101 and/or the service server 103 in the Internet 120 for execution.

The foregoing provides description by using an example in which a task corresponding to a task processing request includes a plurality of child tasks. When a task corresponding to a task processing request is a single task (in other words, the task does not include a plurality of child tasks), the eNB 102 or the core network device may transfer the task to the UE 101 and/or the service server 103 in the Internet 120 for execution.

It should be understood that a task processing method in a communications network provided in the embodiments of this application may be performed by various apparatuses in the communications network, for example, performed by the access network device (for example, the eNB) and the core network device. The core network device may include but is not limited to an MME, a PGW, and an SGW. The following further describes the task processing method in the communications network provided in the embodiments of this application with reference to FIG. 2.

Figure 2:
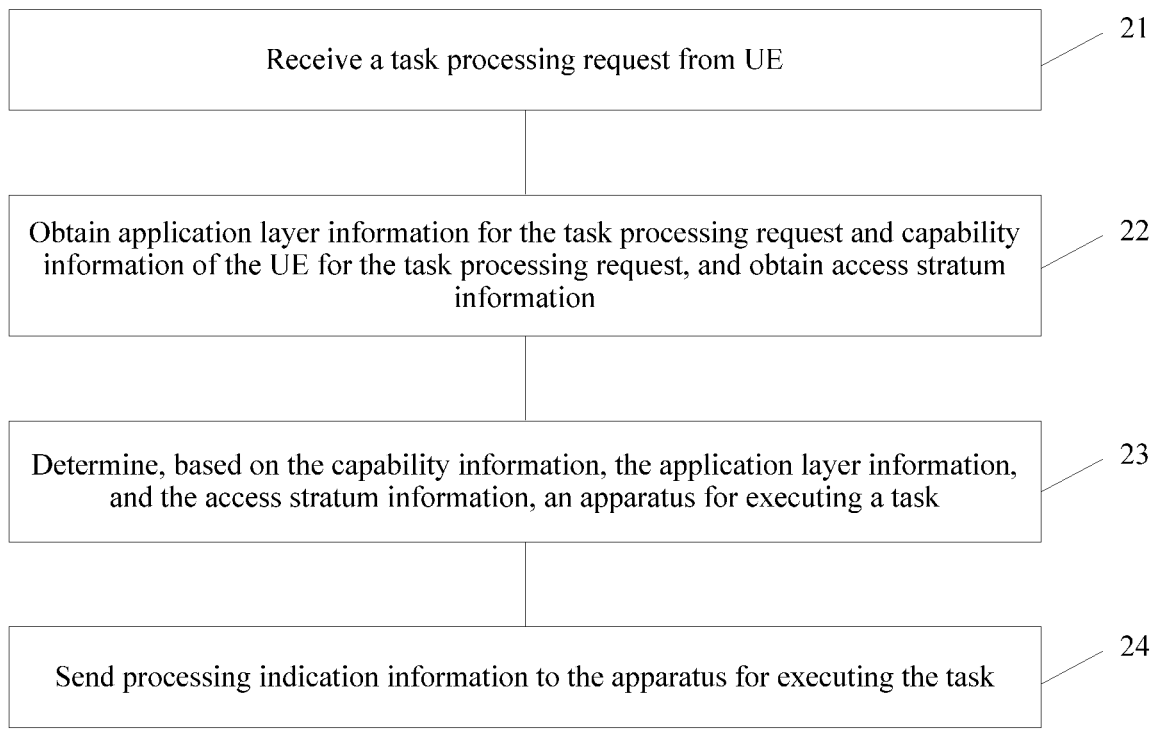
FIG. 2 is a flowchart of a task processing method in a communications network, in accordance with one or more embodiments.

FIG. 2 is a flowchart of a task processing method in a communications network according to an embodiment of this application. Referring to FIG. 2, the task processing method in the communications network provided in this embodiment of this application may include the following steps.

Step 21: Receive a task processing request from UE.

"The task processing request" in this embodiment of this application is used to request to process a task. The task may be a user-specified task or a work task to be executed in the UE. For example, the task processing request sent by the UE may be a request for recognizing a text in a picture taken by a camera, a request for translating a text in a picture taken by a camera from English into Chinese, or a request for obtaining data of a three-dimensional scene in a virtual reality game.

Step 22: Obtain application layer information for the task processing request, capability information of the UE for the task processing request, and access stratum information.

In some embodiments, the application layer information is information related to task processing, and may include image recognition capability information, speech recognition capability information, audio/video processing capability information, positioning capability information, graphics generation capability information, and the like.

When the method shown in FIG. 2 is performed by an access network device, for example, the method is performed by an eNB, the eNB may obtain the application layer information for the task processing request from the UE, and when no MEC unit is deployed in the eNB, the eNB may obtain the application layer information for the task processing request from an independent device, in an access network, in which MEC is deployed (when the access network includes the independent device), a core network device (for example, when a MEC unit is deployed in the core network device), or an Internet server (for example, when no MEC unit is deployed in the core network device). When a MEC unit is deployed in the eNB, the eNB may obtain the application layer information for the task processing request only from the UE. When the method shown in FIG. 2 is performed by an independent device in an access network, the independent device may obtain the application layer information for the task processing request from the UE, and when no MEC is deployed in the independent device, the independent device may obtain the application layer information for the task processing request from an eNB in which MEC is deployed, a core network device in which MEC is deployed, or an Internet server. When MEC is deployed in the independent device, the independent device may obtain the application layer information for the task processing request only from the UE.

When the method shown in FIG. 2 is performed by a core network device in which a MEC unit is deployed, the core network device may need to obtain the application layer information for the task processing request only from the UE. However, a core network device in which no MEC unit is deployed not only needs to obtain the application layer information for the task processing request from the UE, but also needs to obtain the application layer information for the task processing request from an Internet server or a core network device (for example, an eNB or an independent device) in which a MEC unit is deployed.

In some embodiments, "the capability information of the UE for the task processing request" may include at least one of the following: compute capability information, application processing capability information (for example, an image recognition capability and a graph computing capability), and storage capability information. Specific content of the capability information of the UE may vary with a task type. In other words, different tasks may correspond to different capability information. For example, when the task is "recognizing a text in a picture taken by a camera", the capability information may be image recognition capability information, namely, information about whether the UE is capable of recognizing the text in the picture.

When sending the task processing request to the eNB, the UE may report the capability information of the UE for the task processing request to the eNB, for example, by adding the capability information of the UE to the task processing request. In some embodiments, the task processing request from the UE and the capability information of the UE for the task processing request may be sequentially reported. For example, when the task processing request is "recognizing a text in a picture taken by a camera", if the UE has an image processing capability of recognizing the text in the picture, the UE may add the capability information "capable of recognizing the text in the picture" to the task processing request, or sequentially send the task processing request and the capability information.

The access stratum information may include at least one of the following: channel quality information, channel strength information, cell load information, network status information, and frequency resource information. When the method shown in FIG. 2 is performed by the eNB, the eNB may directly obtain the access stratum information. When the method shown in FIG. 2 is performed by the core network device, the core network device obtains the access stratum information from an eNB corresponding to the UE.

Step 23: Determine, based on the capability information, the application layer information, and the access stratum information, an apparatus for executing a task.

When the task is a single task that does not include a plurality of child tasks, the apparatus for executing the task may be directly determined based on the capability information, the application layer information, and the access stratum information. The apparatus for executing the task may be the UE, the access network device, the core network device, or the Internet server.

When the task includes at least two child tasks, for each child task, an apparatus for executing the child task may be determined based on the capability information, the application layer information, and the access stratum information in any one of the following manners. It should be understood that the following several manners are merely examples, and another manner within the protection scope of this application may be alternatively used to determine the apparatus for executing the child task.

Manner 1: When the access stratum information indicates that the UE is suitable for executing the child task, whether the UE is capable of processing the child task is determined based on the capability information; and when the UE is capable of processing the child task, it is determined that the UE is the apparatus for executing the child task; or when the UE is incapable of processing the child task, it is determined, based on the application layer information, that the access network device, the core network device, or the Internet server is the apparatus for executing the child task.

Alternatively, when the access stratum information indicates that the UE is not suitable for executing the child task, it is determined, based on the application layer information, that the access network device, the core network device, or the Internet server is the apparatus for executing the child task.

Certainly, in a process of determining the apparatus for executing the task, a manner (for example, manner 2 or manner 3 in the following) different from the foregoing manner may be used to determine the apparatus for executing the task.

Manner 2: The application layer information is preferentially considered. When the application layer information indicates that the core network device is capable of processing the child task and is not overloaded, it is determined that the core network device is the apparatus for executing the child task.

Alternatively, when the application layer information indicates that the access network device, the core network device, or the Internet server is capable of processing the child task and is overloaded, whether the UE is capable of processing the child task is determined based on the capability information; and when the UE is incapable of processing the child task, it is determined that the access network device, the core network device, or the Internet server is the apparatus for executing the child task; or when the UE is capable of processing the child task and the UE is suitable for executing the child task, it is determined that the UE is the apparatus for executing the child task; or when the UE is capable of processing the child task and the UE is not suitable for executing the child task, it is determined that the UE, the access network device, the core network device, or the Internet server is the apparatus for executing the child task.

Manner 3: Optionally, when the capability information indicates that the UE is incapable of processing the child task, it is determined, based on the application layer information, that the access network device, the core network device, or the Internet server is the apparatus for executing the child task.

Alternatively, when the capability information indicates that the UE is capable of processing the child task, whether the access stratum information indicates that the UE is suitable for executing the child task is determined; and when the access stratum information indicates that the UE is suitable for executing the child task, it is determined that the UE is the apparatus for executing the child task; or when the access stratum information indicates that the UE is not suitable for executing the child task, it is determined that the UE, the access network device, the core network device, or the Internet server is the apparatus for executing the child task.

It should be noted that, that "the access stratum information indicates that the UE is suitable for executing the child task" mentioned in this application means that the current access stratum information indicates that it is suitable to execute the child task on a UE side, and the child task is not transferred to a network-side apparatus (for example, the network-side apparatus is busy) for processing. For example, when a large quantity of uplink air interface resources are required to transmit data of the child task while there are insufficient uplink air interface resources (for example, a quantity of uplink air interface resources is less than a threshold), the case in which "the access stratum information indicates that the UE is suitable for executing the child task" in this application may occur. For another example, when a small quantity of downlink air interface resources are required to transmit data of the child task while there are sufficient downlink air interface resources (for example, a quantity of downlink air interface resources is greater than a threshold), the case in which "the access stratum information indicates that the UE is suitable for executing the child task" in this application may occur.

That "the access stratum information indicates that the UE is not suitable for executing the child task" mentioned in this application means that the current access stratum information indicates that it is not suitable to execute the child task on a UE side, and the child task is transferred to a network-side apparatus (for example, the network-side apparatus is idle) for processing. For example, when a small quantity of uplink air interface resources are required to transmit data of the child task while there are sufficient uplink air interface resources (for example, a quantity of uplink air interface resources is greater than a threshold), the case in which "the access stratum information indicates that the UE is not suitable for executing the child task" in this application may occur. For another example, when a large quantity of downlink air interface resources are required to transmit data of the child task while there are insufficient downlink air interface resources (for example, a quantity of downlink air interface resources is less than a threshold), the case in which "the access stratum information indicates that the UE is not suitable for executing the child task" in this application may occur.

Herein, manners of determining the apparatus for executing the child task are merely described by using examples. Due to the limited examples, in this application, a manner shall fall within the protection scope of this application provided that in this manner, the apparatus for executing the child task is determined based on the capability information, the application layer information, and the access stratum information.

In addition, it should be understood that when the task is a single task that does not include a plurality of child tasks, the apparatus for executing the task may also be determined in any one of the foregoing manners.

Step 24: Send processing indication information to the apparatus for executing the task, where the processing indication information is used to instruct to process the task corresponding to the task processing request, and the apparatus for executing the task is at least one of the UE, the core network device, and the Internet server.

In some embodiments, when the task that the UE requests to process is a single task (for example, a word manually entered by a user needs to be translated) that does not include a plurality of child tasks, the apparatus for executing the task may be the UE, the access network device, the core network device, or the Internet server. In this case, after the apparatus for executing the task processes the task based on the received processing indication information, the UE may present a processing result on a display interface. In an example, the task is to translate a word manually entered by a user into Chinese. When the apparatus for executing the task is a text translation server, the text translation server translates the word into Chinese after obtaining the indication information, and transmits a result to the UE by using the eNB, so that the UE displays the translation result of the word on the display interface.

The foregoing provides description by using an example in which the task does not include a plurality of child tasks. However, in many cases, the task is usually complex, to be specific, the task includes a plurality of child tasks. When the task corresponding to the task processing request sent by the UE includes at least two child tasks, for each child task, the apparatus for executing the child task may be determined based on the capability information, the application layer information, and the access stratum information, and the processing indication information is sent to all the apparatuses for executing the child tasks. For example, it is assumed that there are three child tasks, and apparatuses for executing the child tasks are the UE, the core network device, and the Internet server. When the method shown in FIG. 2 is performed by the eNB, the eNB may send first processing indication information to the UE, send second processing indication information to the core network device, and send third processing indication information to the Internet server. When the method shown in FIG. 2 is performed by the core network device, the core network device may send first processing indication information to the UE, and send second processing indication information to the Internet server.

In the task processing method in the communications network provided in this embodiment of this application, task scheduling is performed by comprehensively considering the capability information, the application layer information, and the access stratum information, and the processing indication information is sent to instruct the apparatus for executing the task to process the task. In this way, resource utilization can be improved.

Figure 3:
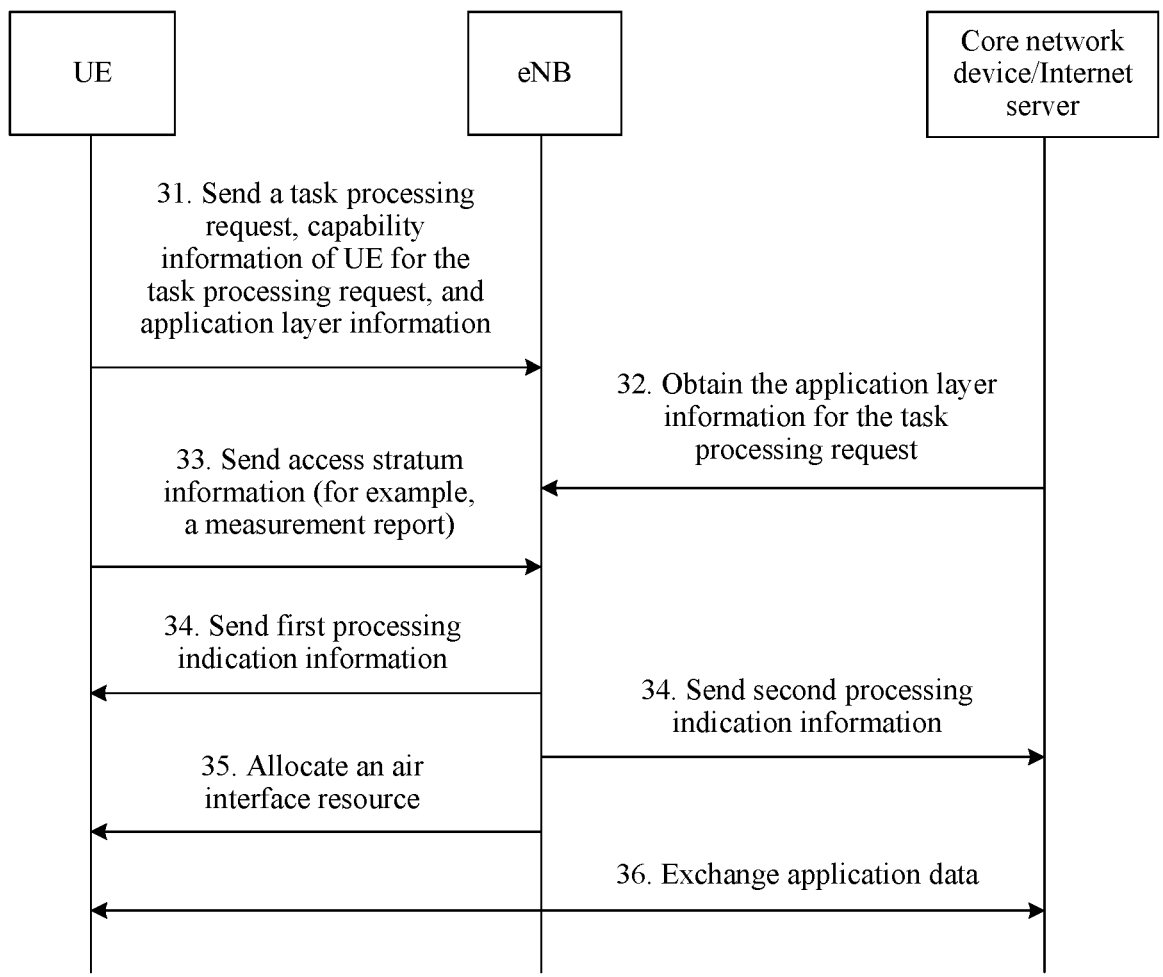
FIG. 3 is a schematic diagram of a task processing method in a communications network, in accordance with one or more embodiments.
Figure 4:
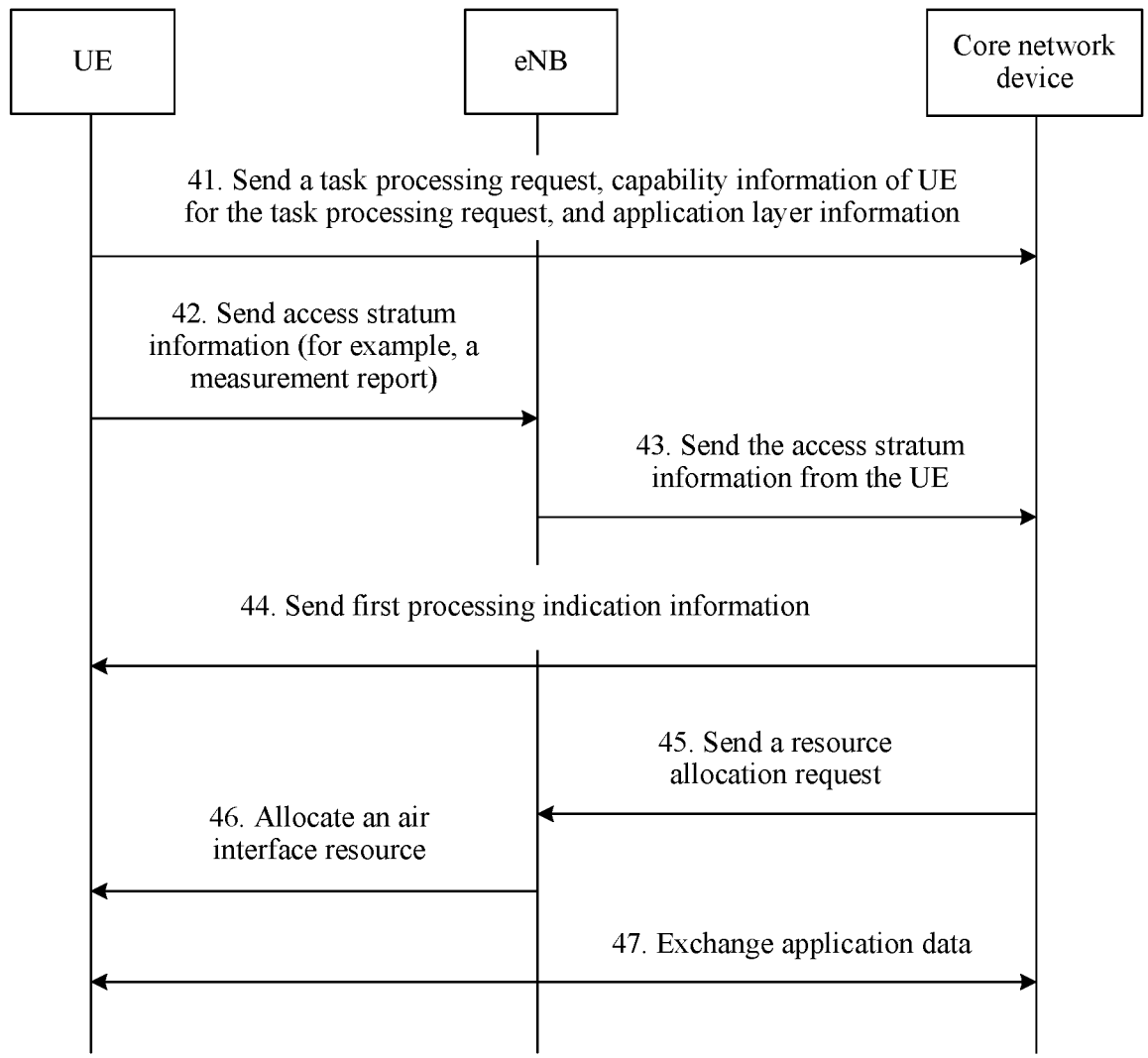
FIG. 4 is another schematic diagram of a task processing method in a communications network, in accordance with one or more embodiments.

The task processing method in the communications network provided in the embodiments of this application is further described below with reference to FIG. 3 and FIG. 4 by using an example in which a task includes a first child task and a second child task. The embodiment shown in FIG. 3 is executed by an eNB, and the embodiment shown in FIG. 4 is executed by a core network device. It should be understood that in this specification, description is merely provided by using an example in which a task includes a first child task and a second child task. It should be understood that when a task includes at least three child tasks, similar processing may be performed. Details are not described again in this specification.

FIG. 3 is a schematic diagram of a task processing method, in accordance with one or more embodiments. In FIG. 3, the task processing method is performed by an eNB, and may include the following steps.

Step 31: UE reports a task processing request, capability information of the UE for the task processing request, and application layer information for the task processing request to the eNB.

In some embodiments, the task processing request, the capability information of the UE for the task processing request, and the application layer information for the task processing request may be separately or jointly reported. This is not limited in this application.

Step 32: The eNB obtains the application layer information for the task processing request. When a MEC unit is deployed in the eNB, the eNB may directly obtain the application layer information for the task processing request. Optionally, when no MEC unit is deployed in the eNB, the eNB may obtain the application layer information for the task processing request from an independent device, in an access network, in which MEC is deployed, a core network device in which MEC is deployed, or an Internet server.

Step 33: The eNB obtains access stratum information, for example, by receiving a measurement report fed back by the UE.

In some embodiments, the UE may perform measurement based on a measurement configuration received from the eNB, and generate the measurement report, and the UE reports the measurement report to the eNB. The measurement report includes received signal strength and received signal quality, and may further include a measurement identifier, a measurement result of a serving cell, a measurement result of a neighboring cell, and the like.

Step 34: The eNB determines, based on the capability information, the application layer information, and the access stratum information, that the UE is an apparatus for executing a first child task and that a core network device in which a MEC unit is deployed is an apparatus for executing a second child task, generates first processing indication information and second processing indication information, sends the first processing indication information to the UE, and sends the second processing indication information to the core network device in which a MEC unit is deployed.

In some embodiments, if the core network device is incapable of executing the second child task, the eNB may use an independent device (if the independent device exists), in an access network, in which MEC is deployed or an Internet server instead of the core network device as the apparatus for executing the second child task, and send the second processing indication information to the Internet server.

The foregoing description is merely an example of determining the apparatus for executing the child task. For each child task, a manner of determining, based on the capability information, the application layer information, and the access stratum information, the apparatus for executing the child task is not specifically limited in this application. For examples of various specific determining manners, refer to the foregoing description.

Step 35: The eNB allocates an air interface resource to the UE.

Step 36: The UE exchanges application data with the core network device for task processing.

After receiving the first processing indication information, the UE may perform task processing based on the first processing indication information. After receiving the second processing indication information, the core network device may perform task processing based on the second processing indication information.

In some embodiments, a task includes the first child task and the second child task, and there may be a dependency relationship between execution of the child tasks. For example, execution of the second child task depends on a processing result of the first child task. In this case, after processing the first child task based on the first processing indication information, the UE may feed back the processing result of the first child task to the core network device. The core network device may process the second child task based on an indication of the second processing indication information and the processing result of the first child task, and feed back a processing result to the UE after processing the second child task. In some embodiments, the UE may display a processing result of the task on a display interface based on the processing result (the processing result may be a final processing result) of the second child task that is fed back by the core network device.

Likewise, when the task includes N (N>2, and N is an integer) child tasks, an apparatus for executing the $K^{th}$ (K is an integer, and K<N) task may feed back an execution result of the $K^{th}$ child task to an apparatus for executing the $(K+1)^{th}$ child task after processing the $K^{th}$ child task, so that the apparatus for executing the $(K+1)^{th}$ child task processes the $(K+1)^{th}$ child task based on the execution result of the $K^{th}$ child task.

In some embodiments, the eNB determines the apparatus for executing the child task by comprehensively considering the capability information of the UE for the task processing request, the application layer information, and the access stratum information, and sends the processing indication information. In this process, a processing capability of the UE and/or a processing capability of the core network device are/is fully used. In this way, resource utilization is improved, consumption of radio transmission resources is reduced, and a network capacity is increased.

The following provides further description by using examples. It should be understood that methods for determining an apparatus for executing a child task in the following examples are merely examples, and are intended to help a person skilled in the art better understand this application, but are not intended to constitute a limitation.

Example 1

For example, a task processing request in this example is "translating an English text in a picture taken by a camera into Chinese". In this case, application layer information reported by the UE may be information about the picture taken by the camera, for example, a size and definition of the picture. A task corresponding to the task processing request includes two child tasks: a first child task of recognizing the English text in the picture taken by the camera and a second child task of translating the English text in the picture into Chinese. Capability information of the UE is that the UE is capable of translating the English text into Chinese, but is incapable of recognizing the English text in the picture.

Initially, the UE sends the task processing request, the application layer information (for example, information about the size of the picture taken by the camera), and the capability information of the UE to the eNB. In addition, the eNB obtains access stratum information, and obtains the application layer information for the task processing request from the core network device or the Internet server.

After the eNB obtains the access stratum information, the capability information of the UE, and the application layer information, if the eNB finds that the UE is incapable of processing the first child task and the access stratum information indicates that the UE is suitable for executing the second child task, the eNB determines that the core network device in which a MEC unit is deployed (this is merely an example herein, and certainly, there may be the Internet server) is an apparatus for executing the first child task and that the UE is an apparatus for executing the second child task, sends first processing indication information to the core network device, and sends second processing indication information to the UE. The first processing indication information instructs the core network device to recognize the English text in the picture taken by the camera, and the second processing indication information instructs the UE to translate the English text into Chinese. Herein, it should be understood that if the capability information of the UE is that the UE is capable of recognizing the English text in the picture, but is incapable of translating the English text into Chinese, when the access stratum information indicates that the UE is suitable for executing the first child task, the first child task may be transferred to the UE for execution, and the second child task may be transferred to the core network device for processing.

After receiving the first indication information, the core network device recognizes the English text in the picture taken by the camera, and sends the English text to the UE by using the eNB.

Then, the UE may execute the second child task, to be specific, translate the received English text into Chinese, based on the received English text. Finally, a result of the task "translating an English text in a picture taken by a camera into Chinese" may be displayed on the display interface of the UE.

Herein, it should be understood that before the UE interacts with the core network device, the eNB allocates a radio resource to the UE, so that the UE may exchange application data with the core network device by using the eNB based on the allocated radio resource.

In some embodiments, the eNB determines the apparatus for executing the child task by comprehensively considering the capability information, the application layer information, and the access stratum information, and sends the processing indication information. In this process, a processing capability of the UE and/or a processing capability of the core network device are/is fully used. In this way, resource utilization is improved, consumption of radio transmission resources is reduced, and a network capacity is increased.

Example 2

For example, a task processing request in this example is "requesting to obtain a three-dimensional scene in a virtual reality game through rendering". In this case, application layer information reported by the UE may be information about the three-dimensional scene. A task includes two child tasks: a first child task of obtaining data of the three-dimensional scene in the virtual reality game and a second child task of obtaining the three-dimensional scene through rendering based on the obtained data. Capability information of the UE is that the UE is capable of obtaining a 3D image through rendering.

Initially, the UE sends the task processing request, the application layer information (for example, the information about the three-dimensional scene that needs to be obtained through rendering), and the capability information of the UE to the eNB. In addition, the eNB obtains access stratum information, and obtains the application layer information for the task processing request from the core network device or the Internet server.

After the eNB obtains the access stratum information, the capability information of the UE, and the application layer information, if the access stratum information indicates that the UE is suitable for executing the second child task and the application layer information indicates that the core network device is capable of processing the first child task, the eNB determines that the core network device in which a MEC unit is deployed is an apparatus for executing the first child task and that the UE is an apparatus for executing the second child task. The eNB sends first processing indication information to the core network device, and sends second processing indication information to the UE. The first processing indication information instructs the core network device to obtain the data of the three-dimensional scene in the virtual reality game, and the second processing indication information instructs the UE to obtain the three-dimensional scene through rendering. In this way, consumption of air interface resources can be reduced.

After receiving the first processing indication information, the core network device obtains the data of the three-dimensional scene in the virtual reality game, and transmits the obtained data to the UE. After receiving the second processing indication, the UE obtains the three-dimensional scene through rendering based on the data from the core network device. Then, the UE may display, on the display interface, the three-dimensional scene obtained through rendering.

In some embodiments, the eNB determines the apparatus for executing the child task by comprehensively considering the capability information, the application layer information, and the access stratum information, and sends the processing indication information. In this process, a processing capability of the UE and/or a processing capability of the core network device are/is fully used. In this way, resource utilization is improved, consumption of radio transmission resources is reduced, and a network capacity is increased.

FIG. 4 is a schematic diagram of a task processing method, in accordance with one or more embodiments. In FIG. 4, the task processing method is performed by a core network device, and a MEC unit may be deployed in the core network device and may include the following steps.

Step 41: UE reports a task processing request, capability information of the UE for the task processing request, and application layer information for the task processing request to the core network device by using an eNB.

Step 42: The eNB obtains access stratum information. For example, the eNB obtains the access stratum information by receiving a measurement report sent by the UE.

Step 43: The core network device obtains the access stratum information from the eNB.

Step 44: The core network device determines, based on the capability information of the UE for the task processing request, the application layer information, and the access stratum information, that the UE is an apparatus for executing a first child task and that the core network device is an apparatus for executing a second child task, generates first processing indication information, and sends the first processing indication information to the UE.

In some embodiments, if the core network device cannot execute the second child task, the core network device may determine that an Internet server is the apparatus for executing the second child task, generate second processing indication information, and send the second processing indication information to the Internet server. Then, the Internet server may process the second child task based on the second processing indication information.

For each child task, a manner of determining, by the core network device based on the capability information of the UE for the task processing request, the application layer information, and the access stratum information, an apparatus for executing the child task is not specifically limited in this application. For examples of various specific determining manners, refer to the foregoing description.

Step 45: The core network device sends a resource allocation request to the eNB, where the resource allocation request is used to instruct the eNB to allocate an air interface resource to the UE. The air interface resource includes a time domain resource and/or a frequency domain resource.

Step 46: The eNB allocates an air interface resource to the UE based on the resource allocation request.

Step 47: The UE exchanges application data with the core network device for task processing.

After receiving the first processing indication information, the UE may process the first child task based on the first indication information. The core network device may process the second child task based on a result obtained by processing the first child task by the UE.

In some embodiments, a task includes the first child task and the second child task, and there may be a dependency relationship between execution of the child tasks. For example, execution of the second child task depends on the processing result of the first child task. In this case, after processing the first child task based on the first indication information, the UE may feed back the processing result of the first child task to the core network device. The core network device may process the second child task based on the processing result of the first child task, and feed back a processing result to the UE after processing the second child task. The UE may display a processing result of the task on a display interface based on the processing result (the processing result may be a final processing result) of the second child task that is fed back by the core network device.

Likewise, when the task includes N (N>2, and N is an integer) child tasks, an apparatus for executing the $K^{th}$ (K is an integer, and K<N) task may feed back an execution result of the $K^{th}$ child task to an apparatus for executing the $(K+1)^{th}$ child task after processing the $K^{th}$ child task, so that the apparatus for executing the $(K+1)^{th}$ child task processes the $(K+1)^{th}$ child task based on the execution result of the $K^{th}$ child task.

In some embodiments, the core network device determines the apparatus for executing the child task by comprehensively considering the capability information of the UE for the task processing request, the application layer information, and the access stratum information, and sends the processing indication information. In this process, a processing capability of the UE and/or a processing capability of the core network device are/is fully used. In this way, resource utilization is improved, consumption of radio transmission resources is reduced, and a network capacity is increased.

Example 3

For example, a task processing request in this example is "translating an English text in a picture taken by a camera into Chinese". In this case, application layer information reported by the UE may be information about the picture taken by the camera, for example, a size and definition of the picture. A task corresponding to the task processing request includes two child tasks: a first child task of recognizing the English text in the picture taken by the camera and a second child task of translating the English text in the picture into Chinese. Capability information of the UE is that the UE is capable of translating the English text into Chinese, but is incapable of recognizing the English text in the picture.

Initially, the UE sends the task processing request, the application layer information (for example, information about the size of the picture taken by the camera), and the capability information of the UE to the core network device by using the eNB. In addition, the core network device obtains access stratum information from the eNB, where the access stratum information includes, for example, channel quality and network status information.

After the core network device obtains the access stratum information and the capability information of the UE, if the core network device finds that the UE is incapable of processing the first child task and the access stratum information indicates that the UE is suitable for executing the second child task, the core network device determines that the core network device is an apparatus for executing the first child task and that the UE is an apparatus for executing the second child task, and sends processing indication information to the UE. The processing indication information instructs the UE to translate the English text into Chinese. Herein, it should be understood that if the capability information of the UE is that the UE is capable of recognizing the English text in the picture, but is incapable of translating the English text into Chinese, when the access stratum information indicates that the UE is suitable for executing the first child task, the first child task may be transferred to the UE for execution, and the second child task may be transferred to the core network device for processing.

The core network device recognizes the English text in the picture taken by the camera, and sends the English text to the UE by using the eNB.

Then, the UE may execute the second child task, to be specific, translate the received English text into Chinese, based on the received English text. Finally, a result of the task "translating an English text in a picture taken by a camera into Chinese" may be displayed on the display interface of the UE.

Herein, it should be understood that before the UE interacts with the core network device, the eNB allocates a radio resource to the UE, so that the UE may exchange application data with the core network device by using the eNB based on the allocated radio resource.

In some embodiments, the core network device determines the apparatus for executing the child task by comprehensively considering the capability information of the UE for the task processing request, the application layer information, and the access stratum information, and sends the processing indication information. In this process, a processing capability of the UE and/or a processing capability of the core network device are/is fully used. In this way, resource utilization is improved, consumption of radio transmission resources is reduced, and a network capacity is increased.

Example 4

For example, a task processing request in this example is "requesting to obtain a three-dimensional scene in a virtual reality game through rendering". In this case, application layer information reported by the UE may be information about the three-dimensional scene. A task includes two child tasks: a first child task of obtaining data of the three-dimensional scene in the virtual reality game and a second child task of obtaining the three-dimensional scene through rendering based on the obtained data. Capability information of the UE is that the UE is capable of obtaining a 3D image through rendering.

Initially, the UE sends the task processing request, the application layer information (for example, the information about the three-dimensional scene that needs to be obtained through rendering), and the capability information of the UE to the core network device by using the eNB. In addition, the core network device obtains access stratum information from the eNB, where the access stratum information includes, for example, channel quality and network status information.

After the core network device obtains the access stratum information and the capability information of the UE, when the capability information indicates that the UE is incapable of processing the first child task, the core network device determines that the core network device in which a MEC unit is deployed is an apparatus for executing the first child task. In addition, when the capability information indicates that the UE is capable of processing the second child task and the access stratum information indicates that the UE is suitable for executing the second child task, the core network device determines that the UE is an apparatus for executing the second child task, and sends processing indication information to the UE. The indication information is used to instruct the UE to execute the second child task.

The core network device obtains the data of the three-dimensional scene in the virtual reality game, and sends the obtained data to the UE by using the eNB. The UE obtains the three-dimensional scene through rendering based on the received data of the three-dimensional scene. Then, the UE may display, on the display interface, the three-dimensional scene obtained through rendering.

In some embodiments, the core network device determines the apparatus for executing the child task by comprehensively considering the capability information of the UE for the task processing request, the application layer information, and the access stratum information, and sends the processing indication information. In this process, a processing capability of the UE and/or a processing capability of the core network device are/is fully used. In this way, resource utilization is improved, consumption of radio transmission resources is reduced, and a network capacity is increased.

Figure 5:
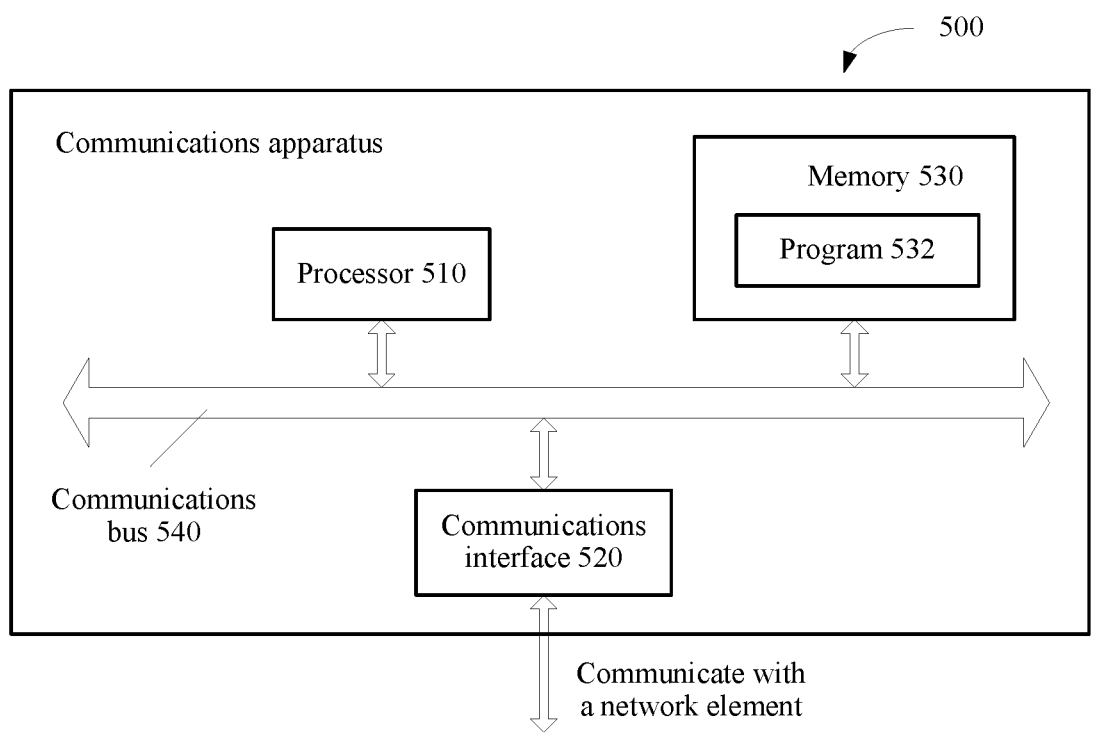
FIG. 5 is a schematic structural diagram of a communications apparatus, in accordance with one or more embodiments.

FIG. 5 is a schematic structural diagram of a communications apparatus, in accordance with one or more embodiments. A task processing apparatus may be an eNB or a core network device. Referring to FIG. 5, a communications apparatus 500 includes a processor (processor) 510, a communications interface (Communications Interface) 520, a memory (memory) 530, and a bus 540. The processor 510, the communications interface 520, and the memory 530 complete communication with each other by using the bus 540. The communications interface 520 is configured to communicate with a network element. The processor 510 is configured to execute a program 532. The program 532 may include program code, and the program code includes a computer operation instruction. The processor 510 may be a central processing unit CPU, an application-specific integrated circuit ASIC (Application Specific Integrated Circuit), or one or more integrated circuits configured to implement this embodiment of this application. The memory 530 is configured to store the program 532. The memory 530 may include a high-speed RAM memory, and may further include a non-transitory memory (non-transitory memory), for example, at least one magnetic disk memory. When the computer instruction is loaded and executed by the processor, any one of the task processing methods in the communications network in this specification is performed.

It should be noted that the communications apparatus in a communications network provided in this embodiment of this application pertains to a same concept as the embodiment of the task processing method in the communications network. For related content, refer to the method embodiment. Details are not described herein again.

Figure 6:
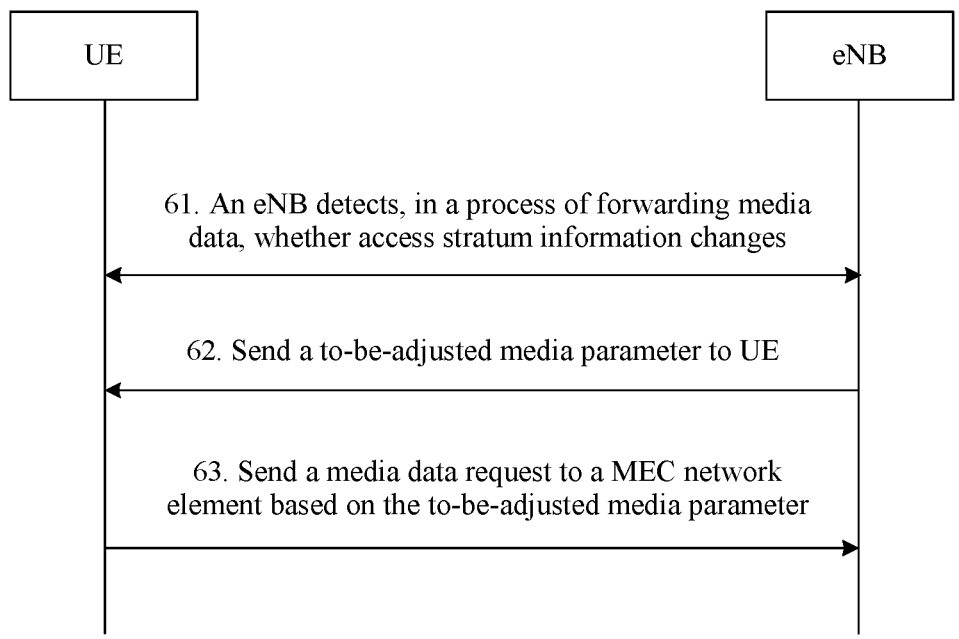
FIG. 6 is a flowchart of a media data transmission method, in accordance with one or more embodiments.

FIG. 6 is a flowchart of a media data transmission method, in accordance with one or more embodiments. The media data transmission method may include the following steps.

Step 61: An eNB detects, in a process of forwarding media data, whether access stratum information changes, where the access stratum information includes wireless channel quality, a network status, cell status information, and the like.

Before this step, UE and a MEC network element transmit media data by using the eNB. Specifically, the MEC network element may send media file information to the UE, the UE may send a media data request to the MEC network element by using the eNB based on the received media file information, and the MEC network element sends a media data response to the UE by using the eNB after receiving the media data request.

In some embodiments, the MEC network element is an apparatus in which a MEC unit is deployed. The MEC network element may be an eNB, a core network device, or the like.

In a process of forwarding the media data between the UE and the MEC network element, the eNB detects whether the access stratum information changes.

Step 62: The eNB sends a to-be-adjusted media parameter to the UE when detecting that the access stratum information changes, where the media parameter may include a media data tuning time interval, bandwidth information available for transmission, a media segment size recommendation, and the like.

In some embodiments, the eNB may send the to-be-adjusted media parameter to the UE by using a medium access control control element (Medium Access Control Control Element, MAC CE) or radio resource control (Radio Resource Control, RRC) signaling.

Step 63: After receiving the to-be-adjusted media parameter from the eNB, the UE sends a media data request to the MEC network element based on the to-be-adjusted media parameter, so that the MEC network element sends a media data response to the UE based on the received media data request.

In this step, after receiving the to-be-adjusted media parameter from the eNB, the UE transfers the to-be-adjusted media parameter to an internal application layer by using an internal access stratum. A specific implementation process of this transfer process is not limited in this application. In this way, the application layer of the UE may send the media data request to the MEC network element based on the obtained to-be-adjusted media parameter.

In some embodiments, in a media data transmission process, the access stratum information is considered. When it is detected that the access stratum information changes, the media parameter may be dynamically adjusted, thereby optimizing resource utilization.

In some embodiments, the UE may actively report media information to the eNB. Then, when detecting that the access stratum information changes, the eNB may adjust the media parameter based on the media information reported by the UE. In this way, it can be ensured that the media parameter is adjusted by comprehensively considering a transmission status of media data transmitted before the media data transmitted by the UE (application layer information) and the access stratum information. Therefore, resource utilization can be optimized, and a relatively good user experience can be ensured.

In some embodiments, the media information reported by the UE to the eNB may include a media file segment size, a requested media tuning interval, a selection range of a media file data rate, and the like.

The following further describes an example in which the media parameter is the media data tuning time interval.

For example, the eNB may send the media parameter to the UE by using the MAC CE or the RRC signaling.

Figure 7:
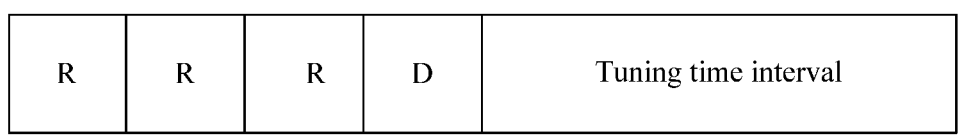
FIG. 7 is a schematic diagram of content of a medium access control control element (Medium Access Control Control Element, MAC CE), in accordance with one or more embodiments.

In this example, the media data tuning time interval is adjusted by using the MAC CE. Content of the MAC CE may be shown in FIG. 7. FIG. 7 shows an octet, where R denotes a reserved bit, D denotes an uplink/downlink indication, D=0 denotes downlink, and D=1 denotes uplink. A recommended tuning interval (Recommended Tuning interval) is a recommended tuning interval, and may be an absolute value of a recommended value, a quantized mapping table, a relative tuning value, or a relative tuning level. R and D each may occupy one bit, and the recommended tuning interval may occupy four bits.

A manner of adjusting an interval value may be shown in FIG. 8 or FIG. 9. Referring to FIG. 8, different bit values of the recommended tuning interval may correspond to different tuning time intervals. For example, when the value of the recommended tuning interval is 0000, it indicates that the tuning time interval is 1 millisecond, and when the value of the recommended tuning interval is 1001, it indicates that the tuning time interval is 0.2 milliseconds. Referring to FIG. 9, different bit values of the recommended tuning interval may correspond to different tuning time interval levels. For example, when the value of the recommended tuning interval is 0000, it indicates that the tuning time interval is increased by one level, and when the value of the recommended tuning interval is 1001, it indicates that the tuning time interval is decreased by two levels. In this application, time of each level may be preset.

In some embodiments, the eNB may alternatively send the media parameter to the UE by using the RRC signaling.

In some embodiments, the content of the RRC signaling may be as follows:

```
Recommended Tuning interval     CHOICE {
    release                     NULL,
    setup                       SEQUENCE {
        direction               ENUMERATED {downlink, uplink}
            OPTIONAL,
        tuning interval         ENUMERATED {
                                    ms1, ms2, ms3, ...,
                                    ms0.1, ms0.2, ms0.3, ...
                                }   OPTIONAL,  -- Need ON
}
```

The RRC signaling may correspond to the case in which the recommended tuning interval is a specific tuning time interval value shown in FIG. 8.

In some embodiments, content of the RRC signaling may be as follows:

```
Recommended Tuning interval     CHOICE {
    release                     NULL,
    setup                       SEQUENCE {
        direction               ENUMERATED {downlink, uplink}
            OPTIONAL,
        relative tuning interval ENUMERATED {
                                    up1step, up2step, up3step, ...,
                                    down1step, down1step, down1step, ...
                                }   OPTIONAL,  -- Need ON
}
```

The RRC signaling may correspond to the case in which the recommended tuning interval is a tuning time interval level shown in FIG. 9.

After receiving the MAC CE or the RRC signaling sent by the eNB, the UE may obtain the media data tuning time interval, and send a media data request to the MEC network element based on the obtained media data tuning time interval. After receiving the media data request from the UE, the MEC network element sends a media data response to the UE based on the received media data request.

In the media data transmission method provided in this embodiment of this application, the media data tuning time interval (which provides an optimal time granularity) is adjusted by comprehensively considering the application layer information and the access stratum information. In this way, resource utilization can be optimized, and a good user experience can be provided.

In some embodiments, a media data transmission system includes a UE and an eNB. The eNB is configured to perform step 61 and step 62 that are mentioned above, and the UE is configured to perform step 63 mentioned above. For specific content of the steps, refer to the foregoing description.

Unless otherwise defined, a technical term or a scientific term used herein should have a general meaning understood by a person of ordinary skill in the art of this application. In the specification and claims of the patent application of this application, the terms "first", "second", and the like are not intended to indicate any order, quantity, or significance, but are intended to distinguish between different components. Likewise, "a/an", "one", or the like is not intended to indicate a quantity limitation either, but is intended to indicate that at least one exists. "Connection", "link", or the like is not limited to a physical or mechanical connection, but may include an electrical connection, whether directly or indirectly.

A person of ordinary skill in the art may understand that all or some of the steps of the embodiments may be implemented by hardware or a program instructing related hardware. The program may be stored in a computer readable storage medium. The storage medium may include a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

The invention claimed is:

1. A task processing method in a communications network, wherein the method comprises:
   receiving a task processing request from user equipment (UE);
   obtaining application layer information for the task processing request and capability information of the UE for the task processing request;
   obtaining access stratum information; and
   sending, based on the capability information, the application layer information, and the access stratum information, processing indication information to an apparatus for executing the task,
   wherein the processing indication information instructs the apparatus to process the task corresponding to the task processing request, and the apparatus for executing the task is at least one of the UE, an access network device, a core network device, or an Internet server.

2. The method according to claim 1, further comprising:
   determining, based on the capability information, the application layer information, and the access stratum information, that at least one of the UE, the access network device, the core network device, or the Internet server is the apparatus for executing the task.

3. The method according to claim 2, wherein the task comprises at least two child tasks, and the determining, based on the capability information, the application layer information, and the access stratum information, that at least one of the UE, the access network device, the core network device, and the Internet server is the apparatus for executing the task comprises:
   determining, for each child task based on the capability information, the application layer information, and the access stratum information, that the UE, the access network device, the core network device, or the Internet server is an apparatus for executing the child task.

4. The method according to claim 3, wherein the determining, for each child task based on the capability information, the application layer information, and the access stratum information, that the UE, the access network device, the core network device, or the Internet server is the apparatus for executing the child task comprises:
   when the access stratum information indicates that the UE is suitable for executing the child task, determining, based on the capability information, whether the UE is capable of processing the child task; and when the UE is capable of processing the child task, determining that the UE is the apparatus for executing the child task; or
   when the UE is incapable of processing the child task, determining, based on the application layer information, that the access network device, the core network device, or the Internet server is the apparatus for executing the child task; or
   when the access stratum information indicates that the UE is not suitable for executing the child task, determining, based on the application layer information, that the access network device, the core network device, or the Internet server is the apparatus for executing the child task.

5. The method according to claim 3, wherein the determining, for each child task based on the capability information, the application layer information, and the access stratum information, that the UE, the access network device, the core network device, or the Internet server is the apparatus for executing the child task comprises:
when the application layer information indicates that the access network device, the core network device, or the Internet server is capable of processing the child task and is not overloaded, determining that the access network device, the core network device, or the Internet server is the apparatus for executing the child task; or
when the application layer information indicates that the access network device, the core network device, or the Internet server is capable of processing the child task and is overloaded, determining, based on the capability information, whether the UE is capable of processing the child task; and when the UE is incapable of processing the child task, determining that the access network device, the core network device, or the Internet server is the apparatus for executing the child task; or
when the UE is capable of processing the child task and the access stratum information indicates that the UE is suitable for executing the child task, determining that the UE is the apparatus for executing the child task; or
when the UE is capable of processing the child task and the access stratum information indicates that the UE is not suitable for executing the child task, determining that the UE, the access network device, the core network device, or the Internet server is the apparatus for executing the child task.

6. The method according to claim 3, wherein the determining, for each child task based on the capability information, the application layer information, and the access stratum information, that the UE, the access network device, the core network device, or the Internet server is the apparatus for executing the child task comprises:
when the capability information indicates that the UE is incapable of processing the child task, determining, based on the application layer information, that the access network device, the core network device, or the Internet server is the apparatus for executing the child task; or
when the capability information indicates that the UE is capable of processing the child task, determining whether the access stratum information indicates that the UE is suitable for executing the child task; and when the access stratum information indicates that the UE is suitable for executing the child task, determining that the UE is the apparatus for executing the child task; or when the access stratum information indicates that the UE is not suitable for executing the child task, determining that the UE, the access network device, the core network device, or the Internet server is the apparatus for executing the child task.

7. The method according to claim 1, wherein the method is performed by the access network device; and
the obtaining application layer information for the task processing request comprises: obtaining the application layer information for the task processing request from the UE, and obtaining the application layer information for the task processing request from the access network device, the core network device, or the Internet server.

8. The method according to claim 3, wherein the method is performed by the core network device;
the obtaining access stratum information comprises: obtaining the access stratum information from an evolved NodeB corresponding to the UE; and
when determining that the UE is the apparatus for executing the child task, the method further comprises: sending a resource allocation request to the evolved NodeB, wherein the resource allocation request is used to instruct the evolved NodeB to allocate an air interface resource to the UE.

9. The method according to claim 1, wherein a mobile edge computing unit is deployed in the core network device or the access network device, the capability information of the UE comprises at least one of the following: compute capability information, application processing capability information, or storage capability information, and the access stratum information comprises at least one of the following: channel quality information, channel strength information, cell load information, network status information, or frequency resource information.

10. A communications apparatus, comprising:
one or more processors; and
a memory having computer readable instructions stored thereon that, when executed by the one or more processors, cause the apparatus to:
receive a task processing request from user equipment (UE);
obtain application layer information for the task processing request and capability information of the UE for the task processing request;
obtain access stratum information; and
send, based on the capability information, the application layer information, and the access stratum information, processing indication information to an apparatus for executing the task,
wherein the processing indication information is usable for instructing the apparatus for executing the task to process the task corresponding to the task processing request, and the apparatus for executing the task is at least one of the UE, an access network device, a core network device, or an Internet server.

11. The communications apparatus according to claim 10, wherein the apparatus is further caused to:
determine, based on the capability information, the application layer information, and the access stratum information, that at least one of the UE, the access network device, the core network device, or the Internet server is the apparatus for executing the task.

12. The communications apparatus according to claim 11, wherein the task comprises at least two child tasks, and the apparatus is further caused to:
determine, for each child task based on the capability information, the application layer information, and the access stratum information, that the UE, the access network device, the core network device, or the Internet server is an apparatus for executing the child task.

13. The communications apparatus according to claim 12, wherein the apparatus is further caused to:
when the access stratum information indicates that the UE is suitable for executing the child task, determine, based on the capability information, whether the UE is capable of processing the child task; and when the UE is capable of processing the child task, determine that the UE is the apparatus for executing the child task; or when the UE is incapable of processing the child task, determine, based on the application layer information, that the access network device, the core network device, or the Internet server is the apparatus for executing the child task; or when the access stratum information indicates that the UE is not suitable for executing the child task, determine, based on the application layer information, that the access network device, the core network device, or the Internet server is the apparatus for executing the child task.

14. The communications apparatus according to claim 12, wherein the apparatus is further caused to:

when the application layer information indicates that the access network device, the core network device, or the Internet server is capable of processing the child task and is not overloaded, determine that the access network device, the core network device, or the Internet server is the apparatus for executing the child task; or when the application layer information indicates that the access network device, the core network device, or the Internet server is capable of processing the child task and is overloaded, determine, based on the capability information, whether the UE is capable of processing the child task; and when the UE is incapable of processing the child task, determine that the access network device, the core network device, or the Internet server is the apparatus for executing the child task; or when the UE is capable of processing the child task and the UE is suitable for executing the child task, determine that the UE is the apparatus for executing the child task; or when the UE is capable of processing the child task and the UE is not suitable for executing the child task, determine that the UE, the access network device, the core network device, or the Internet server is the apparatus for executing the child task.

15. The communications apparatus according to claim 12, wherein the apparatus is further caused to:

when the capability information indicates that the UE is incapable of processing the child task, determine, based on the application layer information, that the access network device, the core network device, or the Internet server is the apparatus for executing the child task; or when the capability information indicates that the UE is capable of processing the child task, determine whether the access stratum information indicates that the UE is suitable for executing the child task; and when the access stratum information indicates that the UE is suitable for executing the child task, determine that the UE is the apparatus for executing the child task; or when the access stratum information indicates that the UE is not suitable for executing the child task, determine that the UE, the access network device, the core network device, or the Internet server is the apparatus for executing the child task.

16. The communications apparatus according to claim 10, wherein the apparatus is further caused to:

obtain the application layer information for the task processing request from the UE, and obtain the application layer information for the task processing request from the access network device, the core network device, or the Internet server.

17. The communications apparatus according to claim 12, wherein the communications apparatus is the core network device, and the apparatus is further caused to:

obtain the access stratum information from an evolved NodeB corresponding to the UE; and when determining that the UE is the apparatus for executing the child task, send a resource allocation request to the evolved NodeB, wherein the resource allocation request is used to instruct the evolved NodeB to allocate an air interface resource to the UE.

18. The communications apparatus according to claim 10, wherein a mobile edge computing unit is deployed in the core network device or the access network device, the capability information of the UE comprises at least one of the following: compute capability information, application processing capability information, or storage capability information, and the access stratum information comprises at least one of the following: channel quality information, channel strength information, cell load information, network status information, or frequency resource information.

19. A non-transitory computer readable medium having instructions stored thereon that, when executed by a processor, cause an apparatus to:

receive a task processing request from user equipment (UE);

obtain application layer information for the task processing request and capability information of the UE for the task processing request;

obtain access stratum information; and send, based on the capability information, the application layer information, and the access stratum information, processing indication information to an apparatus for executing the task, wherein the processing indication information is usable for instructing the apparatus for executing the task to process the task corresponding to the task processing request, and the apparatus for executing the task is at least one of the UE, an access network device, a core network device, or an Internet server.

* * * * *